United States Patent [19]
Stevens

[11] 3,891,057
[45] June 24, 1975

[54] SEMI-AUTOMATIC BEARING LUBRICATOR WORK CENTER

[75] Inventor: Orlando J. Stevens, Jacksonville, Fla.

[73] Assignee: The United States of America as represented by the Secretary of the Navy, Washington, D.C.

[22] Filed: Jan. 11, 1974

[21] Appl. No.: 432,713

[52] U.S. Cl. .............................. 184/7 D; 184/105 R
[51] Int. Cl. ..... F16n 7/40; F16n 13/22; F16n 25/00
[58] Field of Search ........ 184/105 R, 105 A, 105 B, 184/105 C, 15 A, 7 D, 7 E, 7 F

[56] References Cited
UNITED STATES PATENTS
| | | | |
|---|---|---|---|
| 3,527,322 | 9/1970 | Roberts | 184/7 E X |
| 3,715,013 | 2/1973 | Lyte et al. | 184/7 E X |

FOREIGN PATENTS OR APPLICATIONS
| | | | |
|---|---|---|---|
| 392,146 | 4/1933 | United Kingdom | 184/15 A |

Primary Examiner—Richard C. Pinkham
Assistant Examiner—William R. Browne
Attorney, Agent, or Firm—R. S. Sciascia; J. W. Pease

[57] ABSTRACT

A bearing lubricator work center having in one station a plurality of precision lubricant meters and a plurality of lubricant dispensers supplied from a common lubricant storage and common lubricant pump together with a connector and adapter for adapting each dispenser to serve any of a variety of types and sizes of bearings, and actuator circuits responsive to the application of a bearing to a dispenser to actuate the pump via a microswitch and four-way solenoid operated air valve (forming part of each actuator circuit) to dispense a precise volume of lubricant into the bearing.

5 Claims, 10 Drawing Figures

ELECTRONIC SYSTEM SCHEMATIC

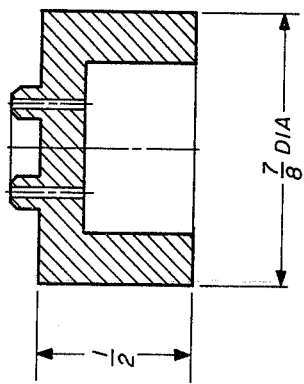
FIG. 4d ADAPTER
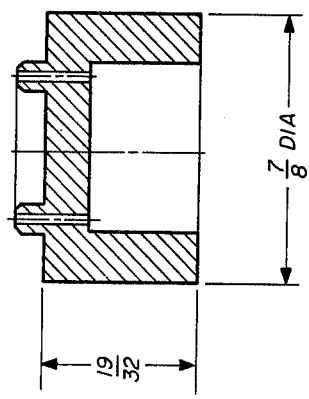
FIG. 4c ADAPTER
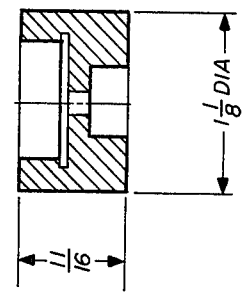
FIG. 4f CONNECTOR
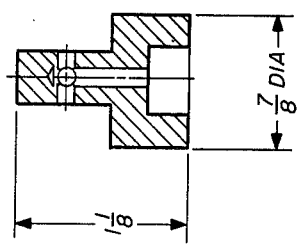
FIG. 4b ADAPTER
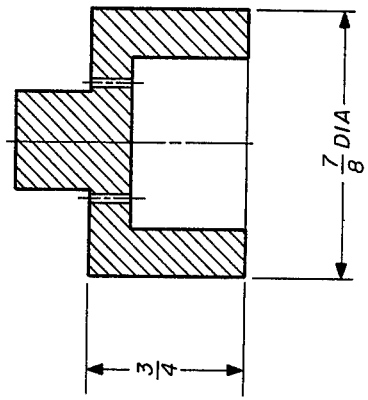
FIG. 4e ADAPTER
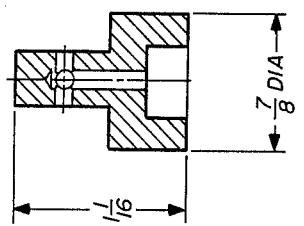
FIG. 4a ADAPTER

SEMI-AUTOMATIC BEARING LUBRICATOR WORK CENTER

BACKGROUND OF THE INVENTION

This invention relates to the field of bearing manufacture and maintenance and has particular relation to an assembly constituting a work center and effective in lubricating a variety of bearings from one or more sources of lubricant.

Many bearing applications today and virtually all aeronautical bearings must have a precise amount of lubricant distributed in a precision manner to specific sliding contact areas of the retainers, races and rolling elements of the bearing. A requirement also exists for the lubricating of large volumes of bearings of types and sizes in the thousands, often with different lubricants for the different types and in a minimum of handling time, equipment and equipment maintenance.

In the past such approaches as hand grease guns, hand pressured grease units, hand packing of bearing elements, packing and removing grease, and control of grease content by weight of bearing and added weight of applied lubricant, together with the use of conveyor and positioning mechanisms, all have now been found to be unsatisfactory in speed, cost, effective result and reliability.

More recent approaches have introduced the use of adjustable injection devices operating from reservoir pump sources of lubricant, nozzle and finger control of lubricant feed and bearing orientation. However, such devices have been limited in effectiveness in properly lubricating all sliding elements as desired, in not applying in the areas required the proper amount of lubricant, in limitation of the apparatus to a single or small variety of bearing types and sizes, in limitation of speed of bearing lubricating, in undesirably long grease change over and maintenance cleaning time and in equipment cost for universal application to a large variety of bearings.

Applicant's system is built about the concept of a semiautomatic work center with capability for continuous service of several sizes and types of bearings at one time, rapid change via connectors and adapters to any size and type of bearing, and with further capability of serving with different lubricants various bearings simultaneously from several service stations forming the work center and comprising separate reservoir-pump sources, thereby avoiding purge requirements for lubricant changeover. Applicant's system also provides improved beneficial results in providing a single standard dispensing unit suitable via connectors and adapters to apply lubricant properly to a large variety of types and sizes of bearings without loss of lubricant during operation. About 20,000 different types and sizes of bearings are in use today and approximately 4,000 of these are in aeronautical operation, a field for which the subject invention finds particular application to improve accuracy of amount and placement of lubricant, speed of operation, to reduce cost and operator fatigue, adaptability to the variety of types and sizes of bearings used and minimum cost in equipment. The invention also provides the capability of adaptation to computer programming.

SUMMARY OF THE INVENTION

This invention contemplates at least one common lubricant storage and pump means associated with pluralities of adjustable lubricant metering means and associated dispensing means wherein the dispensing means each have the capability via connectors and adapters to service an unlimited variety of types and sizes of bearings. This invention further contemplates the arrangement of several lubricant storage and pump means and associated metering and dispensing means in a compact work center providing the advantages of servicing with several different lubricants simultaneously and without the need to purge systems and providing further a more rapid production output of serviced bearings at less cost and with improved quality.

BRIEF DESCRIPTION OF THE DRAWING

FIGS. 4a through 4f are cross sectional elevational views of typical connectors and adapters utilized in the system of FIG. 1.

DESCRIPTION OF THE PREFERRED EMBODIMENTS

Figure 1:
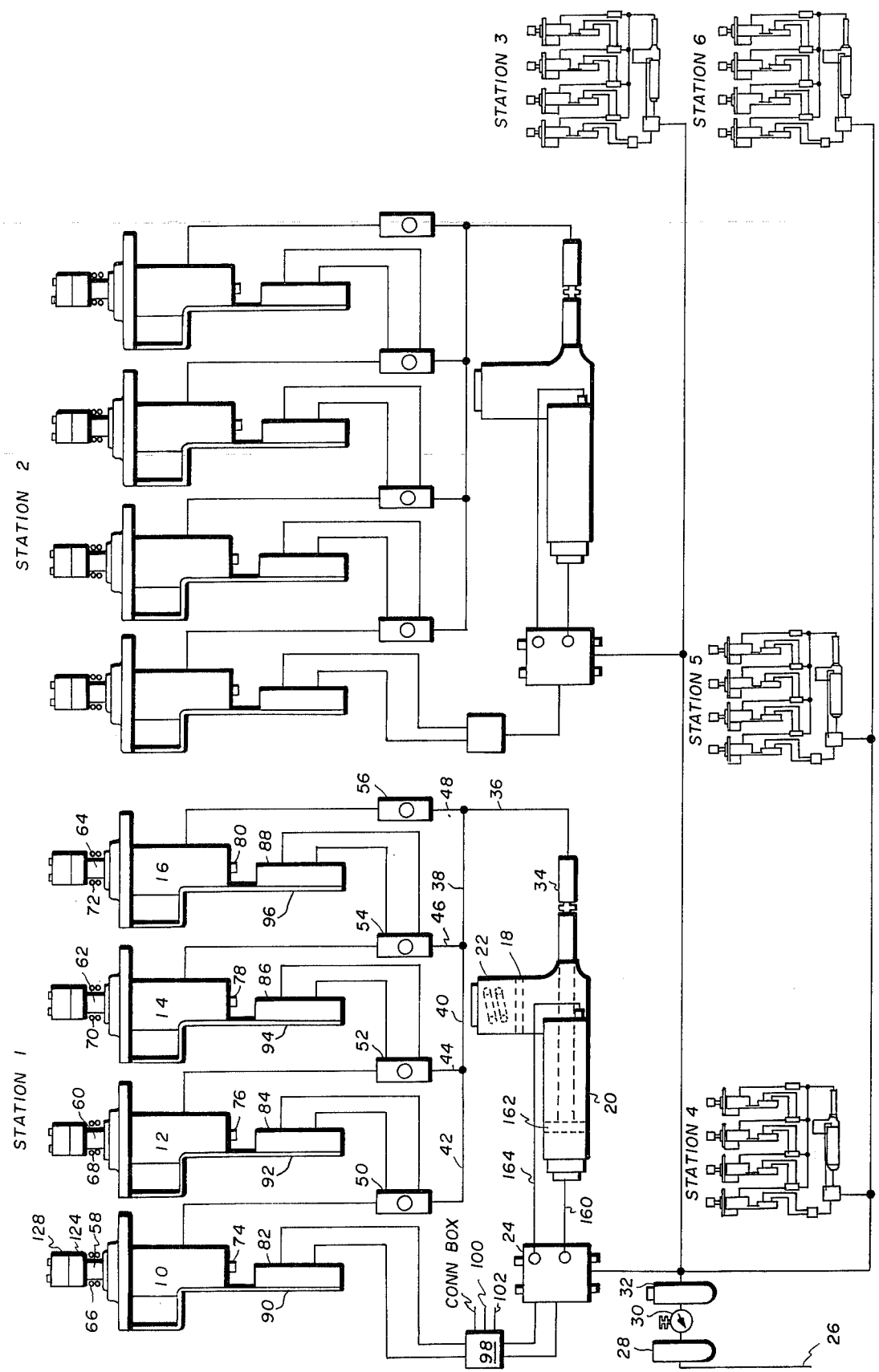
FIG. 1 is a schematic and diagrammatic view of a system incorporating the invention.

Referring to FIG. 1 one aspect of the invention contemplates a bearing lubricator work center comprising, as identified as station 1, a plurality of lubricant dispensers 10, 12, 14, 16 supplied from a common storage-pump source 18 having a pump portion 20 and reservoir 22. The pump 20 is operated through a four-way solenoid valve 24 from an air line 26 via an air filter 28, air regulator 30 and air line lubricator 32. A line check valve 34 is interposed in lines 36, 38, 40, 44, 46, 48 serving metering devices 50, 52, 54 and 56 through which the respective dispensers 10, 12, 14 and 16 have slide valve portions 58, 60, 62 and 64, compression springs 66, 68, 70 and 72, biasing the valves to upwardly extended normally closed position and adjustable detents 74, 76, 78, 80 engageable with respective micro switches 82, 84, 86 and 88 which are supported on brackets 90, 92, 94 and 96. The micro switches are electrically connected as indicated through a connection box 98 to the electrically operated solenoid valve 24. Lines 100 and 102 connected to the box 98 indicate a source of electrical power for the solenoid 24.

Figures 2, 3:
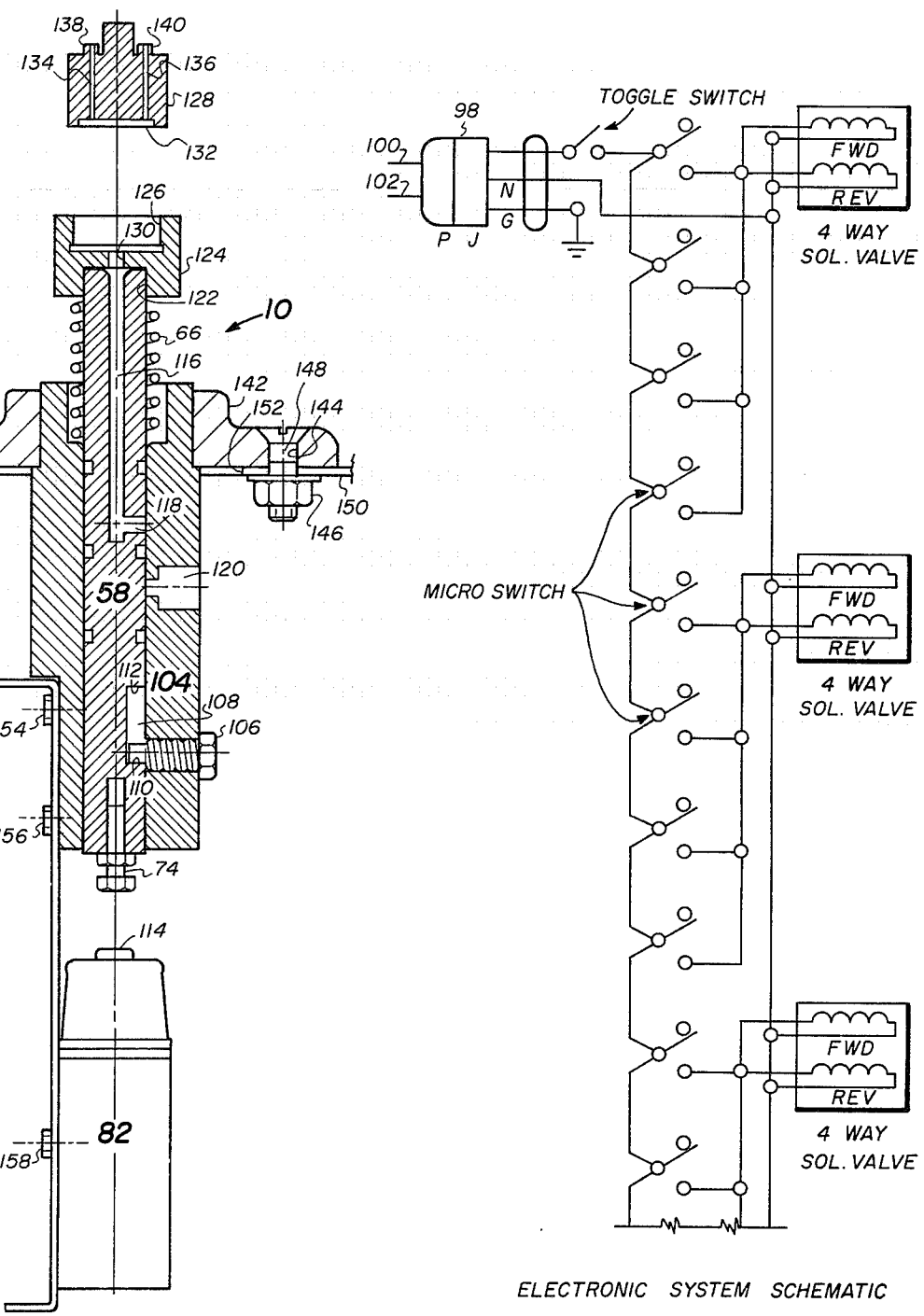
FIG. 2 is an elevational view partly in cross section of a dispenser of the type shown in FIG. 1.
FIG. 3 is a schematic of an electrical system suitable for connecting four-way solenoid valves and microswitches utilized in the system of FIG. 1.

Reference is now made to FIG. 2 for a detailed view and description of a dispenser 10 exemplary of the 10, 12, 14 and 16 dispensers shown in FIG. 1 as well as all of the remaining dispensers which will be mentioned hereinafter. Dispenser 10 comprises a housing 104 in which is slideably fitted the slide valve 58, compressed by spring 66 to the upwardly extended position shown wherein further upward movement is prevented by engagement of the slide valve with a stop screw 106, a projection end of the latter projecting into a slot 108 formed in the housing 104. The slot has a bottom stop surface 110 and upper stop surface 112. The detent 74 is formed as a stop screw with lock nut shown to effect adjustability in relation to engagement of a top actuated element 114 of the micro switch 82. Formed in the slide valve 58 is a central passageway 116 communicating with a radial passageway 118 therein. Radial passageway 118 aligns with a housing radial passageway 120 (threaded to receive a grease line) when the slide valve is in its downward (opened) position and stop 106 is engaged with slot surface 112. At this moment detent 74 is in engagement with actuator 114 of micro switch 82 to close the latter and call for lubricant to be passed to the dispenser 10 as will be described hereinafter. The upper end of slide valve 58 is threaded as at 122 to receive a particular adapter, one form of which is shown at 128 and whose form and shape is made to serve a particular type and size of bearing to be lubricated. The connector 124 is formed with a passageway 130 through which lubricant is passed to a recessed area 132 of adapter 128 and thence via passageways 134 and 136 through projections 138 and 140 which mate with portions of a bearing (not shown) to be served.

The housing 104 of dispenser 10 is provided with a threaded flange 142 in which the housing is secured and the flange 142 is apertured as at 144 and provided with nuts 146 and screws 148 for securing the dispenser to a surface plate 150 apertured as at 152 to pass the dispenser housing. The bracket 90 is spot welded or otherwise fixed to the plate 150 and is bolted as at 154 and 156 to the housing 104 to aid in supporting the same. The bracket 90 also serves to align and support the micro switch 82 by bolting as indicated at 158.

Referring to FIGS. 4a through 4e there is shown several types of adapters which can be employed with dispenser 10 for various types and sizes of bearings. Each of the adapters with the exception of that shown in FIG. 4b is used in conjunction with the connector for adapters shown in FIG. 4f. The adapter of FIG. 4b can be threaded directly onto the upper end of the slide valve 58 and needs no connector.

Referring now to FIGS. 1 and 2 and considering for the moment a cycle of operation at station 1, a bearing (not shown) is placed on the bearing adapter 128, the metering device 50 is set to the precise amount of lubricant to be discharged, and the bearing on its adapter is pressed downward compressing slide valve spring 66, aligning passageways 118 and 120 and closing micro switch 82 via detent 74. Thus, the solenoid valve 24 is energized, activating pump 18 to form a measured amount of lubricant through metering device 50 and the dispenser 10 to the bearing (not shown) being lubricated. Release of the bearing after being lubricated causes the valve 58 to slide upward under the bias of spring 66 to close the valve. The system is vented. The metering device 50 is precharged with the proper amount of lubricant automatically, and the unit is ready for the next cycle.

FIG. 3 shows a suitable electrical system for operating the four-way valve 24 and associated pump 18 from the several micro switches 82, 84, 86 and 88. Closing of any of the electrical switches shown in FIG. 3 opens four-way valve 24 (FIG. 1) permitting air to flow to pump 18 via line 160 forcing its air piston 162 forward and forcing lubricant through supply line 36 to the injectors. When the same switch in FIG. 3 is opened and the four-way valve closes air exhausts back through the four-way valve. Air also flows into the return side of the pump 18 via line 164 reversing the air piston therein and completing the lubrication cycle.

In station 1 the common pumping source 18 and associated metering devices 50, 52, 54 and 56 and lubricant dispensers 10, 12, 14 and 16 form a four unit work center. Flexibility is provided by the adjustability of the metering devices to provide a precise desired amount of lubricant, by the plurality of dispensers through which several different types and sizes of bearings can be greased from the one station and by the variations of adapters through which changes can be made in the set-up for change in types and/or sizes of bearings.

However, it is also an aspect of the subject invention to provide a work center comprising several groups of dispensers, each group associated with a common pump and lubricant reservoir and constituting a station and to encompass such station in a suitable enclosure to form a more flexible work center. Such a work center includes for example the additional stations 2 through 6 shown in FIGS. 1 and 5. A distinct advantage of this arrangement is that we can now use six different types of lubricants simultaneously and avoid the need to purge the system of one lubricant and refill with another. Additional advantages are the facts that 6 times as many bearings can be lubricated without changing adapters and the whole system can be incorporated into a service cabinet of conveniently arranged lubricant dispensers and associated equipment.

Thus, in FIG. 1, there is shown the additional stations 2 through 6. The stations 2 through 6 are identical in structure and operation to that of station 1 which has been described in detail, except that different lubricant and different adapters may be used at each station. Thus, the additional stations per se require no further description.

Figure 5:
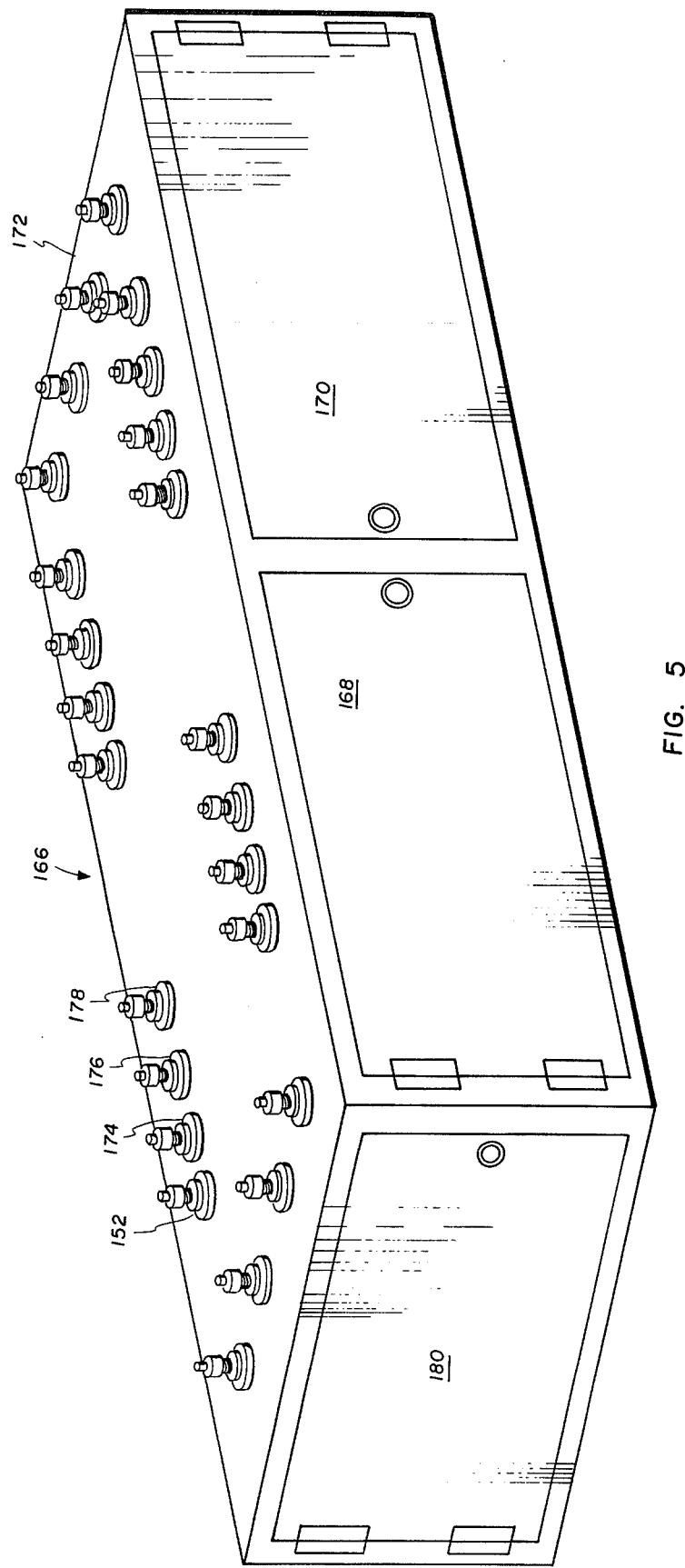
FIG. 5 is a perspective view showing the housing and arrangement of the several groups of elements forming the overall system of FIG. 1.

Referring to FIG. 5, however, there is shown a housing in the form of a cabinet 166 with front doors 168 and 170. The top 172 of the cabinet is formed with aligned groups of apertures, one group being indicated at 152, 174, 176, and 178. The six groups of apertures represent the six stations indicated in FIG. 1 through which project the connector ends of the lubricant dispensers as indicated in FIG. 5. The remainder of the equipment shown in FIG. 2 is located and supported inside the cabinet 166. The cabinet with lubricating equipment may be mounted on wheels (not shown) for mobile service or supported on a bench. Additional side doors as for example door 180 may also be formed in the cabinet.

This system has been found to provide an improvement in efficiency, utility, and speed because it is flexible and wide range in application, rapid, accurate and simple in use. There is no waste of lubricant, no loss of time in set-up and each bearing is precisely lubricated in repeated operations. The system is also, because of its wide range in flexibility, adaptable to computerized program operation.

This system is also of particular use in the lubrication of shielded/sealed bearings, heretofore considered unsalvageable in that there was no way to control either the amount or location of the grease inside the bearing. All salvageable bearings can be put back into service by use of this hereinbefore described lubrication center. The shielded/sealed bearings can be cleaned for lubrication in the work center by use of vibration, pressured cleaning solvent in a closed environment.

What is claimed is:

1. A bearing lubricator work center comprising
   a. a common lubricant storage means and a common lubricant pump for storing a specific lubricant and for pumping said lubricant under pressure, b. a plurality of lubricant metering means each connected to said common pump to receive said lubricant under pressure and each having lubricant volume adjusting means for passing a specific desired volume of lubricant, c. a plurality of bearing adapters each sized and shaped to accommodate one of a range of bearing types and sizes, d. a plurality of lubricant dispensing means each connected to receive lubricant input from an associated of said metering means and each having a connector sized and shaped for receiving selectively each of said bearing adapters, e. an air filter, air regulator, air line lubricator means and a four-way solenoid operated air valve connected to said pump, f. said lubricant dispensing means including a slide valve having a spring biasing said valve to normal "off" position, said valve being moveable to a depressed "on" position when a bearing is pressed on its bearing adapter and against said slide valve spring bias, and g. an electrical system including a micro switch means engageable by said slide valve in "on" position of the latter and connected to operate said solenoid air valve to actuate said lubricant pump and through said metering and lubricant dispensing means to lubricate said bearing when said slide valve is depressed.

2. A bearing grease service work center comprising in combination a plurality of grease systems for application of a different type grease from each system, each system including a. a common lubricant storage means and a common lubricant pump for storing a specific lubricant and for pumping said lubricant under pressure, b. a plurality of lubricant metering means each connected to said common pump to receive said lubricant under pressure and each having lubricant volume adjusting means for passing a specific desired volume of lubricant, c. a plurality of bearing adapters each sized and shaped to accommodate one of a range of bearing types and sizes, d. a plurality of lubricant dispensing means each connected to receive lubricant input from an associated of said metering means and each having a connector sized and shaped for receiving selectively each of said bearing adapters, e. an air filter, air regulator, air line lubricator means and a four way solenoid operated air valve connected to said lubricant pump, f. said lubricant dispensing means including a slide valve having a spring biasing said valve to normal off position, said valve being moveable to a depressed on position when a bearing to be lubricated is pressed on a bearing adapter and against said slide valve spring bias, and g. an electrical system including a micro switch means engageable by said slide valve in on position of the latter and connected to operate said solenoid air valve to actuate said lubricant pump and through said metering and lubricant dispensing means to lubricate said bearing when said slide valve is depressed.

3. Apparatus according to claim 1 a. said lubricant dispensing means including a stationary housing in which said slide valve is slideably positioned, said spring being a compression spring connected to said slide valve and said housing to bias said valve to off condition, b. said housing and slide valve having passage ways formed for non-aligned position when said valve is biased in off position and for aligned position when said valve is in on position to thereby effect the alternate interruption and passage of lubricant therethrough, c. said slide valve having a bearing head end threaded to receive selected of said connectors for selectively receiving said bearing adapters upon which a bearing may be positioned, moved against the bias of said spring to position said slide valve in on position and admit a metered amount of grease to said bearing.

4. Apparatus according to claim 3 wherein a. said lubricant dispensing means includes an adjustable detent fixed to the opposite end of said slide valve from said bearing head end to engage and operate said micro switch when said housing and slide valve passage ways are aligned to actuate said lubricant pump and force lubricant to the bearing end of said lubricant dispensing means.

5. Apparatus according to claim 4 a. said slide valve being formed with an elongated slot therein and said housing being apertured and provided with a stop screw to limit the on and off positions of said slide valve.

* * * * *